UNITED STATES PATENT OFFICE.

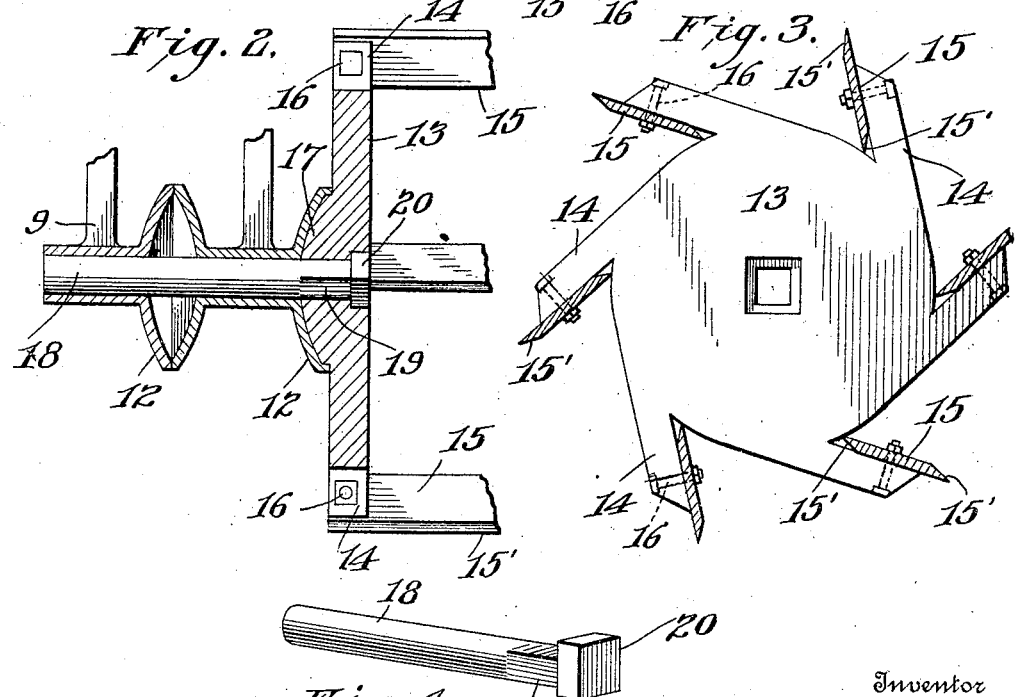

MATTHEW E. CLANTON, OF REDDING, MISSISSIPPI.

STALK-CUTTER.

946,720.

Specification of Letters Patent. Patented Jan. 18, 1910.

Application filed August 19, 1909. Serial No. 513,672.

*To all whom it may concern:*

Be it known that I, MATTHEW E. CLANTON, a citizen of the United States, residing at Redding, in the county of Calhoun and State of Mississippi, have invented certain new and useful Improvements in Stalk-Cutters, of which the following is a specification, reference being had to the accompanying drawings.

This invention relates to certain new and useful improvements in cultivator attachments and more particularly to a stalk cutter of new and novel construction which is adapted to be mounted in adjustable hangers which ordinarily carry the cultivator disks.

The primary object of my invention is to provide an attachment of the above character which may be readily positioned in the machine without necessitating any alteration in the construction thereof.

Another object is to provide a stalk cutter attachment of very simple construction, which may be manufactured at small cost, without impairing its efficiency or durability.

A further object is to provide a rake, secured to the machine frame and disposed in advance of the cutter which will elevate the stalks into position to be cut as the machine is being driven.

With these, and other objects in view, the invention consists in the various combinations and arrangements of parts which are fully described in the following specification and particularly pointed out in the appended claim.

In the accompanying drawing forming a part of this specification and in which similar reference characters indicate similar parts throughout the several views; Figure 1 is a rear elevation of a cultivator with my improved stalk cutter attached thereto; Fig. 2 is an enlarged longitudinal section of one end of the cutter showing the manner of mounting the same; Fig. 3 is a transverse section illustrating the arrangement of the knives; and Fig. 4 is a detail perspective view of one of the attaching bolts.

In the preparation of the soil for planting purposes, it is an essential requirement for the production of the best results, that the stalks and other stubble, be first removed before the ground is harrowed. Heretofore this has been a slow and tedious process and has been extremely laborious and disagreeable. My present invention is devised with a view to facilitating the rapid completion of this preparatory work and to this end I have shown in the accompanying drawing a cultivator of any usual or preferred construction which comprises the frame 5 and the traction wheels 6 mounted on the ends of an axle 7. As the construction of the cultivator frame is not an essential feature of the present invention it will not here be set forth in detail.

Transversely positioned in the frame, there is a yoke 8, upon the ends of which the hangers 9 are adjustably mounted. In the ordinary use of the machine as a cultivator, the disk gangs are revolubly mounted in these hangers and are vertically movable into and out of engagement with the soil by means of the levers 10 which are held in position by the usual spring actuated dog engaging with the teeth of a rack segment. The hangers 9 are formed with the cylindrical journal boxings 11, and the concavo-convex disk engaging portions 12. The stalk cutter which forms the subject matter of the present invention is adapted to be positioned between the inner ends of the journal boxes as clearly shown in Fig. 1.

The cutter comprises the two heads 13 each of which is formed with a plurality of tangentially disposed arms 14 to which are secured the ends of the knives 15. Each of the edges of the knives are sharpened as shown at 15′ and the securing screws 16 have their heads countersunk in the arms 14. It will be noted that the edges of the knives extend beyond the ends of the arms thus insuring the cutting of the stalks close to the ground. When one edge has become dulled the knives may be readily removed and reversed. The heads 13 are formed with a central enlargement 17 which is of convex formation and engages in the disk receiving portions 12 of the journals. Attaching bolts 18 extend through the center of the heads and are rotatably disposed in the journal boxes 11. One end of these bolts is formed with a squared portion 19 and a square head 20, which is countersunk in the inner face of the cutter heads. The square portions of the bolts extend entirely through the heads and any independent rotative movement of the cutter is thus prevented.

A rake 21 is positioned in advance of the cutter and comprises the stout spring steel wires which are suitably secured at their upper ends to the frame of the machine. Coils 22 are formed in the wires adjacent to their upper ends and to their lower ends the rake blade 23 is secured. The blade 23 is positioned close to the ground and is adapted to elevate the stalks which have been depressed, into the path of movement of the knives 15. Owing to the spring coils 22, should the rake strike an obstruction it will resume its normal position immediately after passing over the same.

From the foregoing it will be seen that I have provided a very simple stalk cutter attachment for cultivators by means of which the labor heretofore required for the clearing of the ground is eliminated. The device may be readily attached to any of the numerous constructions of cultivators without incurring any additional expense or necessitating the employment of skilled labor. It is moreover extremely simple, strong and durable in construction and highly efficient in operation. It will be understood that many minor modifications may be resorted to without departing from the spirit or sacrificing any of the advantages of the invention and I reserve the right to make such changes as I may deem best within the scope of the claim.

The bolts 18 which secure the cutter in position are the same which are employed for attaching the cultivator disks in the hangers and may be utilized in connection with the various forms of cultivators.

Having thus described the invention, what is claimed is:

The combination with a cultivator, having journal boxes transversely adjustable on the cultivator frame, said journal boxes having concavo-convex bearing plates integrally formed therewith, of a cutter comprising spaced heads, each of said heads having a flat outer face and a central convex portion adapted to be received in said bearing plates, attaching bolts extending through the heads and mounted in the journal boxes, each of said bolts having a square head countersunk in the inner face of the cutter head and a square shank portion extending through the convexity thereof, and a plurality of knives secured at their ends to the heads and disposed in tangential relation thereto.

In testimony whereof I hereunto affix my signature in the presence of two witnesses.

MATTHEW E. CLANTON.

Witnesses:
  J. M. PENDERGRAST,
  D. H. AUREY.